United States Patent [19]

Roselius et al.

[11] 4,153,063

[45] May 8, 1979

[54] PROCESS FOR THE EXTRACTION OF NICOTINE FROM TOBACCO

[75] Inventors: Wilhelm Roselius, Magnus; Otto Vitzthum, Bremen; Peter Hubert, Bremen-Lesum, all of Fed. Rep. of Germany

[73] Assignee: Studiengesellschaft Kohle mbH, Mülheim, Ruhr, Fed. Rep. of Germany

[21] Appl. No.: 390,967

[22] Filed: Aug. 23, 1973

Related U.S. Application Data

[63] Continuation of Ser. No. 177,220, Sep. 2, 1971, abandoned.

[30] Foreign Application Priority Data

Sep. 2, 1970 [DE] Fed. Rep. of Germany ....... 2043537
Aug. 23, 1971 [DE] Fed. Rep. of Germany ....... 2142205

[51] Int. Cl.² ............................................. A24B 3/14
[52] U.S. Cl. .................. 131/143; 131/17 R; 131/144
[58] Field of Search ............... 131/17, 143, 144, 135, 131/140 C; 260/291

[56] References Cited

U.S. PATENT DOCUMENTS 3,424,171   1/1969   Rooker .............................. 131/143

FOREIGN PATENT DOCUMENTS 1512060 12/1967 France ................................... 131/143
1111422  7/1965 United Kingdom ..................... 131/143
1057911  2/1967 United Kingdom ..................... 131/135

OTHER PUBLICATIONS

"Dangerous Properties of Industrial Materials," Sax, 3rd edition, 1968, Reinhold Publishing Co., N.Y., pp. 962, 968, 780, 1129.

Luganskaja, L. N. et al., "On the Aromatization of Tobacco" and "Use of Tobacco Dust Extract for Aromatizing Purposes", pub.—from "Tobacco Abstracts", vol. 12, #6, Jun. 1968, pp. 394 and 395, abstracts 1258 and 1259.

Primary Examiner—Robert W. Michell
Assistant Examiner—V. Millin
Attorney, Agent, or Firm—Sprung, Felfe, Horn, Lynch & Kramer

[57] ABSTRACT

Process for extracting nicotine is disclosed in which tobacco is exposed to an extracting solvent in either liquid or gaseous state at temperatures below about 100° C. and at high pressures. The aroma generating substances can be removed by conducting the extraction with the tobacco in dry condition. Thereafter the tobacco can be moistened, and on further contacting the nicotine is removed. The aroma generating substances can then be recombined with nicotine free tobacco.

32 Claims, 6 Drawing Figures

INVENTORS
WILHELM ROSELIUS
OTTO VITZTHUM
PETER HUBERT

BY Henry T. Burke
ATTORNEY

PROCESS FOR THE EXTRACTION OF NICOTINE FROM TOBACCO

This is a continuation of application Ser. No. 177,220, filed Sept. 2, 1971, now abandoned.

BACKGROUND OF INVENTION

A number of processes have been studied and patented for the removal of toxic or otherwise offending substances from tobacco and like stimulants. It is known, for example, to extract nicotine from tobacco with solvents such as ammonia, ethylene oxide and the like. These and similar processes have not attained general acceptance due to the fact that the extraction solvents are not sufficiently selective and remove not only the nicotine, but varying amounts of the desirable constituents associated with the pleasant aroma of tobacco.

The use of condensed gases has been studied quite extensively because of the known selective dissolving capacity of these substituents. The use of liquid $SO_2$ has been described in German Patent No. 558,351, wherein a process for removing nicotine from tobacco is disclosed. This extraction solvent has not attained any appreciable acceptance due to the fact that $SO_2$ is not sufficiently selective, may generate toxic residues and is highly corrosive to the apparatus employed.

Accordingly, the art has long concerned itself with the problem of selective extraction of nicotine from tobacco with nontoxic solvents which do not corrode the apparatus employed.

THE INVENTION

It has now been discovered in accordance with this invention, that a variety of extraction agents having solvent capacity for nicotine in both their liquid and gaseous phases can be employed to severly reduce the nicotine content of tobacco without at the same time removing the desirable constituents thereof and thereby making the tobacco commercially unacceptable.

The preferred solvent for use in this invention is $CO_2$. Other useful solvents include, for example, halogenated hydrocarbons including up to about 4 carbon atoms such as $CF_4$, $CHF_3CClF_3$, $CBrF_3$, $CF_2=CH_2$, $CF_3$-$CF_2$-$CF_3$. $CHClF_2$, $CCl_2F_2$ $CHCl_2F$, $CCl_3F$, $CBrF_3$, $CFCl$-$CF_2$, $CH_3$-$CF_3$, octafluorocyclobutane; other useful solvents include: $CO_2$, $N_2O$, $SF_6$, Ar.

At or near room temperature the solvents are normally gaseous at atmospheric pressure. The supercritical state of a solvent of this invention is one in which the solvent is in the gaseous phase at a temperature which is sufficiently high so that it can not be liquefied by increasing the pressure. The subcritical state of the solvents of this invention is one in which the temperature is sufficiently low so that the gas can be liquefied by the application of pressure. A solvent of the invention can be transformed from the supercritical state to the subcritical state by cooling. It is often more convenient to liquefy by expanding and cooling. The solubility characteristics of the solvents of the invention vary appreciably when the solvent passes from the subcritical to the supercritical state or vice versa.

Supercritical $CO_2$ is $CO_2$ whose temperature is above its critical temperature, i.e. above 31.3° C., in its gaseous phase under high pressure, e.g. 70 to 1500 atmospheres pressure. In the practice of this invention, the preferred range is 70 to 350 atmospheres pressure, i.e. above the critical pressure for $CO_2$, which is about 70 atmospheres. Accordingly, the $CO_2$ supercritical extraction is carried out at a pressure of from about 70 to 1500 atmospheres at a temperature which may vary from just above the critical temperature to as high, for example, as about 100° C. The range of temperature and pressure for the supercritical state which with the other solvents useful in the practice of this invention are of generally the same order of magnitude. For supercritical operations the temperature is generally lower and the pressure is from about 70 to 300 atmospheres.

In a typical application of the process of this invention, the moisture content of tobacco is increased to about 25%, the pressure on the tobacco is increased to about 300 atmospheres and the temperature is increased to approximately 70° C. for a brief period of time. This brief treatment has the effect of deactivating the burning ferments in the tobacco so that it remains light in color. The tobacco which is contained in an extraction vessel, is then traversed with, for example, $CO_2$ in the supercritical state and the nicotine dissolves into the extraction solvent. The supercritical gas is then freed of the dissolved nicotine for example by expansion and cooling to convert it to a liquid in the subcritical state. Nicotine is insoluble in the liquid extraction solvent and precipitates. The extraction solvent from which the nicotine has been removed may be again converted to the supercritical state and recycled.

The continuous operation may be carried on for several hours to reduce the nicotine content of the tobacco to a desired low value and the tobacco may be thereafter dried if desired. A particular advantage of this process is that under the conditions employed the aroma producing constituents of the tobacco do not dissolve in the extraction solvent. The pleasing aroma, therefore, is preserved and the content of undesirable nicotine is reduced.

It has been discovered that the process may be generally carried out at lower pressures with tobacco having a relatively high moisture content up to about 25%. The process may be effected successfully with both leaf and cut tobacco and it is immaterial whether or not the tobacco is fermented. The water content should not be less than 20%.

The nicotine removed from the tobacco is substantially pure and may be readily recovered. The main contaminates are secondary alkaloids.

In contrast to the known procedure for the removal of nicotine with liquid $SO_2$, $CO_2$ and the other solvents of this invention are highly selective and the extract contains almost exclusively nicotine. The treated tobacco is not altered in aroma or appearance.

While it is generally more convenient to use relatively pure solvents, it is possible to utilize mixtures of solvents. The addition of a small amount of ammonia to supercritical $CO_2$ appears to improve the results.

If the browning of the tobacco caused by fermentation below 60° is acceptable, it is not necessary to use the solvents of this invention, including $CO_2$, in the supercritical state. Instead the solvents can be used in the subcritical state, which is generally more convenient because of the lower pressures and temperatures employed.

In a typical example of the application of this invention to the subcritical state, the moisture content of tobacco is increased to from about 10 to 25% and liquid $CO_2$ is traversed through the extraction vessel containing the tobacco under a pressure of from about 65 to 300 atmospheres. The process can be carried out in vessels at room temperature, i.e. from about 20° C. to 35° C. so that problems of heat exchange are minimized. The nicotine accumulates in the circulating liquid $CO_2$. It may be recovered by simply evaporating the $CO_2$. The substantially pure nicotine contaminated mainly by secondary alkaloids remains as a residue. The aroma of the tobacco thus treated does not differ appreciably from untreated material and corresponds substantially to that of the tobacco treated using supercritical $CO_2$. Similar results are obtained by the other solvents of this invention and with $CO_2$ to which a small amount of ammonia has been added.

Another especially preferred procedure makes it possible to obtain all aroma constituents in the tobacco in quantities not heretofore thought possible. In the first stage of this process the aroma constituents of the tobacco are removed by traversing an extraction vessel containing dry tobacco with a dry supercritical extraction liquid. Under these conditions only the aroma constituents, along with negligible quantities of nicotine are extracted. The supercritical extraction solvent in the gaseous phase is then separated into a vessel where it is liquefied by bringing it to subcritical conditions.

In the second state the remaining nicotine is removed from the aroma-free wetted tobacco by circulated wet supercritical gas. It is separated in a separate vessel, preferably by contacting the extraction solvent containing the nicotine with dilute sulfuric acid to form a nicotine salt. Alternatively, the nicotine can be recovered by adsorption for example by passing the extraction liquid containing the solute through a column containing a sorptive agent such as active carbon. It may also be recovered of course by liquefying the gas as described above.

After drying the tobacco from the second stage to the desired moisture content, the aroma constituents which were separated in the first stage are returned to the tobacco. This may be effected by depositing the constituents from a solvent containing them and also containing the suspended tobacco. For example, the solvent may be simply evaporated to precipitate the constituents. The product obtained by this preferred process is one which is substantially free of nicotine and does not differ appreciably from the starting material in aroma, color or structure.

In carrying out this preferred process, $CO_2$ is the preferred extraction agent. Alternative solvents which are especially useful include: $N_2O$, $SF_6$, Ar, $CClF_3$ and other lower halogenated hydrocarbons.

The density of the tobbcco normally employed in the process of this invention is from about 0.1 to 0.3 kilograms per liter. Nicotine content is determined by the picrate method as described in the "Handbuch der Lebensmittelchemie," vol. VI, 1970, p. 320.

INSTRUMENTATION

Figure 1:
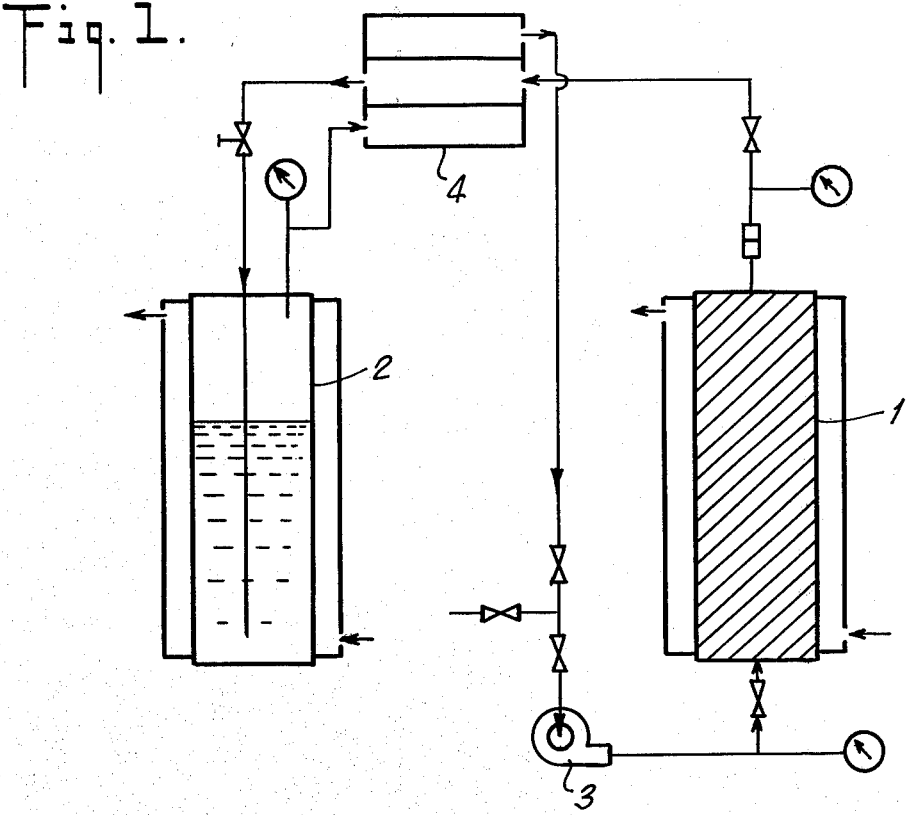
FIG. 1 illustrates the apparatus for working under supercritical conditions.

1. Supercritical operation (a) FIG. 1 shows the apparatus for working under supercritical conditions. This method is characterized in that the extraction agent is supplied to vessel 1 under supercritical conditions, traverses the tobacco contained therein, and in so doing extracts the nicotine. For continuous separation of the nicotine the extraction solvent is allowed to expand into the vessel 2 and is cooled, i.e. brought to subcritical conditions. It is thereby liquified and its solvent properties change, so that the nicotine is separated by precipitation. When $CO_2$ is the extraction solvent the temperature in vessel 2 is maintained between 0 and 25° C. The $CO_2$ present in the vapor zone above the liquid phase is almost free of nicotine and is pumped by the compressor 3 through a heat exchanger 4, which increases the temperature of the $CO_2$ to at least 35° C. The latter thereby becomes compressible to high pressures without liquifying. The system thus permits resupplying to the extractor almost pure solvent. Extraction solvents useful for this method include, for example, $CO_2$, $N_2O$, $SF_6$, $CHF_3$, $CClF_3$, Ar, $CBrF_3$, $CF_2=CH_2$, $CF_3-CF_2-CF_3$. $N_2O$, $SF_6$. The preferred solvents are $CClF_3$, Ar and $CO_2$.

Figure 2:
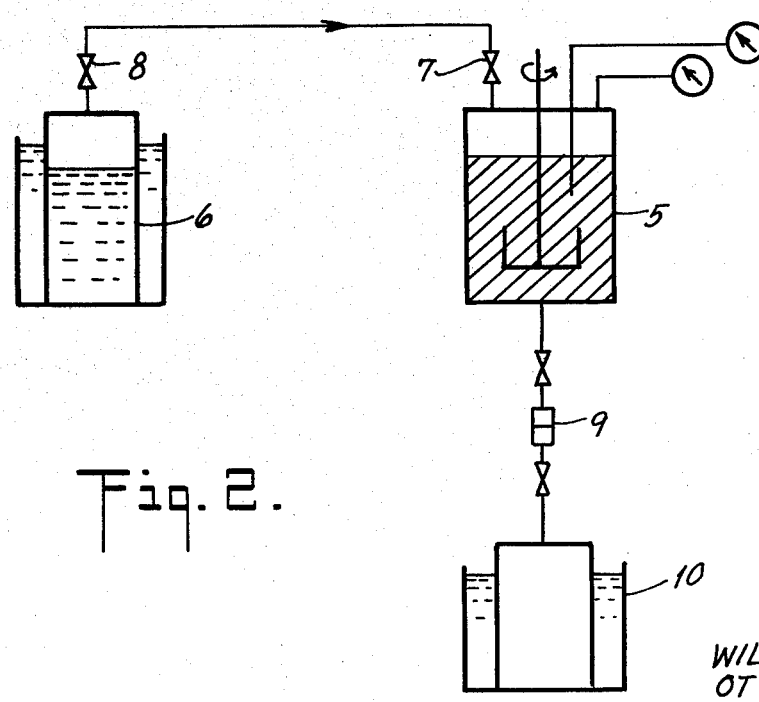
FIG. 2 illustrates the apparatus for working under supercritical and subcritical conditions.

(b) For working with lower halogenated hydrocarbons an apparatus according to FIG. 2 is used. It operates, not in a cycle, but with individual extractions. Vessel 5 is charged with tobacco, and vessel 6 with the halogenated hydrocarbon. By heating 6, the contents are transferred to 5, and after valves 7 and 8 have been closed, the contents of 5 are likewise heated and stirred. The solvent is discharged through the filter 9 into the cooled receiver 10. From the latter it is slowly evaporated and the extract remains as a residue. This process is repeated until the desired nicotine content is reached. The apparatus according to FIG. 2 is suitable in principle both for the supercritical and subcritical operation. Under subcritical conditions the solvent column is forced out of 5 into the receiver 10 by pressurizing, suitably with $N_2$ or other reaction inert gas.

Suitale solvents for supercritical extraction include $CO_2$, $N_2O$, Ar, $SF_6$, $CHF_3$, $CF_4$, $CClF_3$, $CBrF_3$, $CF_2=CH_2$, $CF_3-CF_2-CF_3$; and for subcritical extraction; $CO_2$, $N_2O$, $SF_6$, $CHF_3$, $CHClF_2$, $CHCl_2F$, $CClF_3$, $CCl_2F_2$, $CCl_3F$, $CBrF_3$, $CFCl-CF_2$, $CF_2=CH_2$, $CH_3-CF_3$, octafluorocyclobutane, $CF_3-CF_2-CF_3$.

Figure 3:
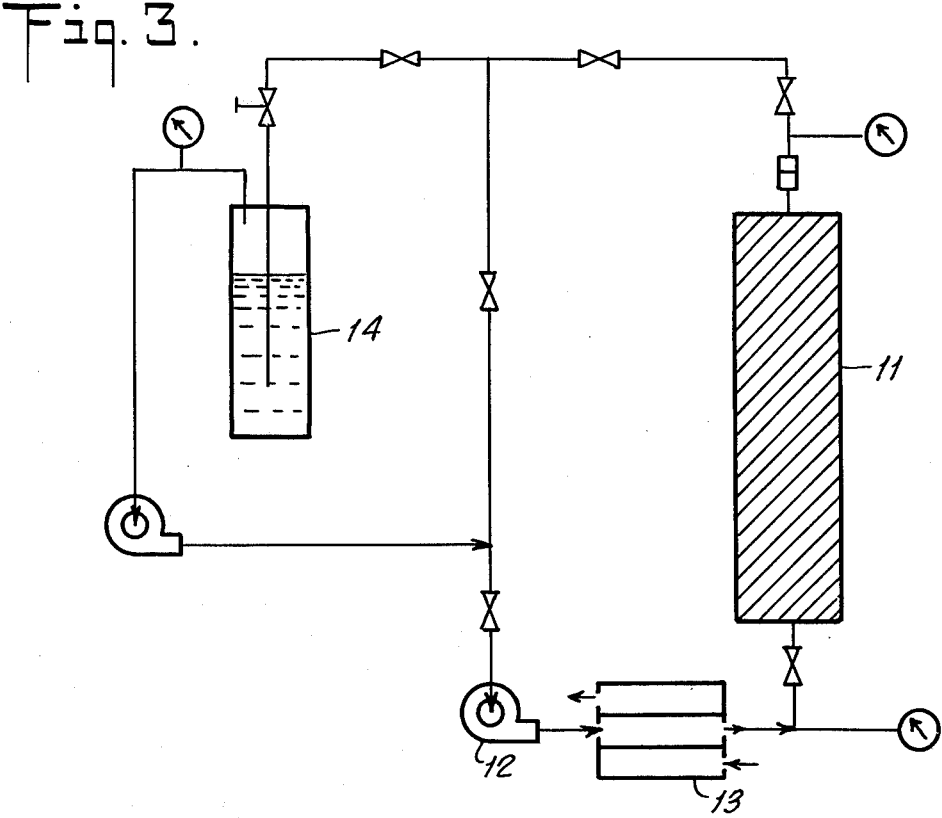
FIG. 3 illustrates a modification of the apparatus according to FIG. 1.

(c) FIG. 3 shows a modification of the apparatus according to FIG. 1. The main cycle consists only of the extraction vessel 11, compressor 12 and heat exchanger 13. By means of a shunt, any desired quantity of the extract-laden medium can be branched off from the main cycle and the extract can be separated in 14, in the same manner as in the apparatus of FIG. 1. This system is advisable when the solvent capacity of the extraction solvent used is great and only a relatively small proportion need be freed from the extract. Typically useful extraction agents include those mentioned above for supercritical expansion.

Figures 5, 6:
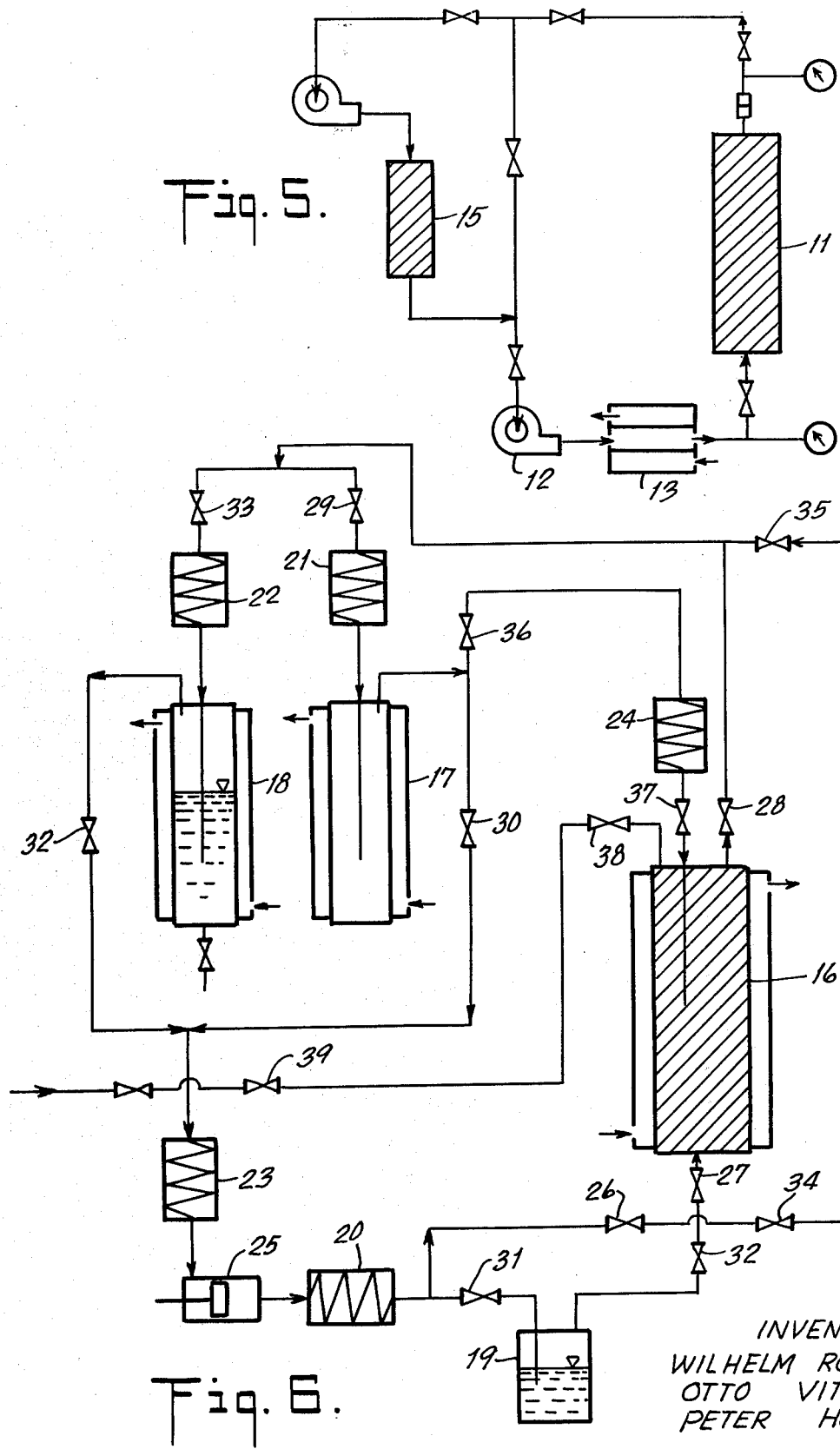
FIG. 5 illustrates an apparatus for the separation of nicotine.
FIG. 6 illustrates an apparatus for a three stage process.

(d) A further possibility for the separation of the nicotine from the extraction agent is shown in FIG. 5. It corresponds more or less to FIG. 3 and like apparatus are similarly numbered. The vessel 14 in the shunt is replaced by an adsorption column 15. The latter may be charged with active carbon, ion exchanger resins, aluminum oxide, silica gel or impregnated kieselguhr as well as with molcular filters, such as zeolites, which remove the nicotine from the medium introduced in the shunt by adsorption. In this connection, the ion exchanger substances are used only because of their adsorption capacity. In what form they occur is therefore immaterial. This arrangement has the advantage that the shunt can be operated under super-critical conditions. The regeneration of the sorption column may be effected with dilute soda lye, washing with dilute hydrochloric acid, and drying at about 110° C. The supercritical extraction agents mentioned above may be employed in this process.

2. Subcritical operation

Figure 4:
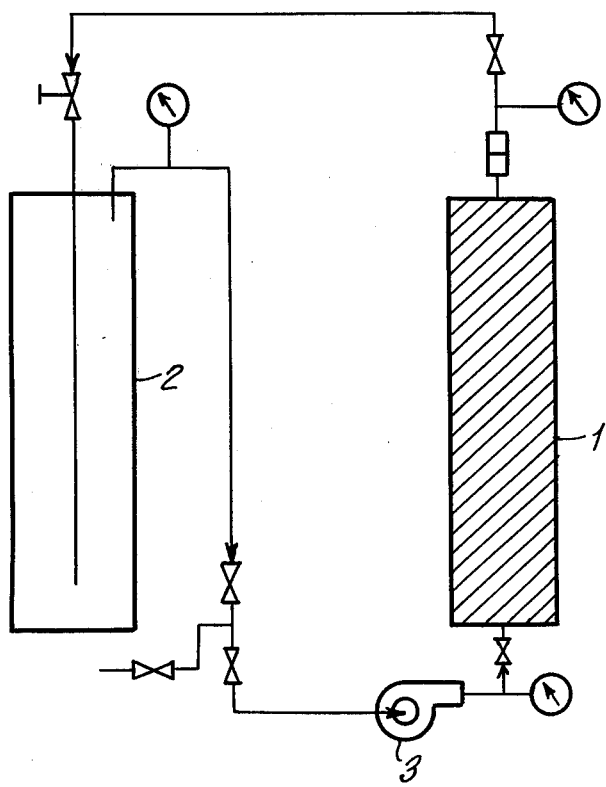
FIG. 4 illustrates an apparatus similar to FIG. 1.

Here the apparatus which is shown in FIG. 4 is similar to FIG. 1 and the apparatus is similarly numbered. It is modified in the sense that vessel 2 is likewise completely filled with liquid gas and instead of the compressor a liquid gas pump is used. Because of the gradual concentration of the nicotine in the solvent, the solvent : tobacco ratio is higher than in supercritical operation to obtain the same final content of nicotine in the tobacco. Suitable extraction solvents include those mentioned for subcritical operations.

3. Three stage process

The apparatus shown in FIG. 6 includes the vessels 16 to 19, the heat exchangers 20 to 24, and the conveyor 25, which may be a compressor or a liquid gas pump, depending on the method of carrying out the process. At 26, the gas used for the extraction is supplied to the apparatus. Vessel 16 is filled with dry tobacco, vessel 19 contains water, and vessel 18 preferably 2N sulfuric acid; alternatively aqueous solutions of picric acid or silicotungstic acid can be used for taking up the nicotine.

First stage

To vessel 16 dry gas is supplied under supercritical conditions, which removes the aroma constituents from the tobacco. In vessel 17 their separation (precipitation) is effected by bringing the gas to subcritical conditions, i.e., liquifying it by expansion and cooling. Before re-entering vessel 16, the gas is brought back to supercritical conditions. The cycle passes through the heat exchanger 20, valves 26 and 27, vessel 16, valves 28 and 29, heat exchanger 21, vessel 17, valve 30, and heat exchanger 23. All other valves and paths are closed.

Second stage

From the aroma-free tobacco the nicotine is removed by wet supercritical gas. The cycle is conducted under isothermal conditions. The nicotine taken up by the gas from the tobacco contained in vessel 16 is bound as salt by the sulfuric acid contained in vessel 18. The nicotine-free gas stream leaves vessel 18 without a content of moisture which wets the tobacco in vessel 16. It has been found that not even a trace of either the sulfuric acid or the sulfuric nicotine salt is entrained by the gas stream.

The cycle passes from the conveyor 25 over the heat exchanger 20, valve 31, water vessel 19, valves 32 and 27, vessel 16, valves 28 and 33, heat exchanger 22, vessel 18, valve 32 and heat exchanger 23; all other paths and valves are closed. As soon as the nicotine content of the tobacco has been lowered to the desired value, the temperature in vessel 18 is lowered to about 10° to 20° C. below that of vessel 16, but remains supercritical.

The water taken up by the tobacco is thereby returned into vessel 18 and the tobacco is dried to the desired moisture content.

Third stage

In this stage, the aroma constituents previously separated in vessel 17 are returned to the tobacco in vessel 16. This is accomplished by reversing the cycle of the first stage, that is, vessel 17 is flushed with supercritical gas, which takes up the aroma substances, and the gas in vessel 16 is brought to subcritical conditions by lowering the temperature and pressure, so that liquefaction of the gas and segregation occurs and the aroma substances are deposited on or impregnated into the tobacco. The cycle pases from conveyor 25 over the heat exchanger 20, valves 26, 34, 35, 29, heat exchanger 21, vessel 17, valve 36, heat exchanger 24, valve 37, vessel 16, valves 38 and 39, and heat exchanger 23. All other valves and paths are closed.

In a variant of the above described process, the separation of the nicotine from the carrier medium in the second stage can be effected by suitable sorbents, as for example active carbon.

It is also possible to achieve nicotine separation in the second stage by bringing the pressure and temperature of the gas to subcritical conditions by expansion of the gas stream into the empty vessel 17, whereby liquefaction, segregation and hence precipitation of the nicotine occur. The nicotine-free gas drawn off in the gas zone above the liquid is subsequently returned to supercritical conditions in compressor 25 and in the heat exchangers.

In the execution of these two variants the water supply present in vessel 19 is utilized for wetting the tobacco.

The following non-limiting examples are given by way of illustration only.

EXAMPLE 1

1 kg of Virginia tobacco (adjusted water content 25%) is treated in the apparatus according to FIG. 1 at 70° C. by a stream of supercritical $CO_2$ at 300 atm ($CO_2$ density is approximately 0.7 g/cm$^3$). The weight ratio of $CO_2$ to tobacco is maintained at 6.3 : 1 to 4.9 : 1.

After the treatment, nicotine content of the tobacco is reduced to 0.08% in the dried product. The starting value was 1.36%, dry. Its aroma does not differ from the untreated material.

EXAMPLE 2

1 kg of Virginia tobacco (adjusted water content 15%) is treated with $CO_2$ in the apparatus according to FIG. 1 at 50° C. and 1000 atm ($CO_2$ density is approximately 1 g/cm$^3$).

The weight ratio $CO_2$ : tobacco is maintained at 9 : 1 to 7 : 1. After the treatment the nicotine content of the tobacco is reduced to 0.12%, dry. The starting value was under 1. No difference from the starting material was noted in the aroma.

EXAMPLE 3

1 kg of Virginia tobacco (adjusted water content 20%) is treated in the apparatus according to FIG. 1 at 70° C. and 250 atm with $CO_2$ to which 5% by weight of $NH_3$ has been added. The weight ratio $CO_2$ : tobacco is maintained at 6.5 : 1 to 4.9 : 1. After the treatment, pure $CO_2$ is blown through the tobacco for 30 minutes at room temperature to expel the ammonia. For this about 200 Nl of $CO_2$ per 1 kg of tobacco are needed. The nicotine content was reduced to 0.03%, dry. The aroma was not impaired.

EXAMPLE 4

1 kg of Orient tobacco (adjusted water content 25%) is treated with argon in the apparatus according to FIG. 5 in a manner similar to Example 1 at 20° C. and 325 atm. (Ar density is approximately 0.5 g/cm³).

The weight ratio Ar : tobacco is maintained at 4.5 : 1 to 3.5 : 1. The nicotine content after treatment was reduced to 0.15%, dry. The aroma was not impaired.

EXAMPLE 5

Portions of 1 kg of Orient tobacco (adjusted water content 12%) are treated in the apparatus according to FIG. 2 once subcritically at 25° C. and ca. 28 atm. and again supercritically at 60° C. and ca. 250 atm with trifluoromonochlormethane. The weight ratio solvent : tobacco is maintained at 11 : 1 to 8 : 1 and 6.5 : 1 to 5 : 1, respectively. Reduced nicotine contents of 0.2% and 0.11% dry, respectively, were attained. The aroma was not impaired.

EXAMPLE 6

1 kg of Orient tobacco (adjusted water content 25%) is treated in the apparatus according to FIG. 4 at 28° C. by a stream of liquid $N_2O$ under ca. 65 atm. The weight ratio $N_2O$: tobacco is maintained at 5 : 1 to 3.8 : 1. The nicotine content after treatment was reduced to 0.08%, dry. The aroma was not impaired.

EXAMPLE 7

1 kg of Virginia tobacco (adjusted water content 20%) is treated by a stream of supercritical $SF_6$ in the apparatus according to FIG. 3 at 70° C. and ca. 300 atm. Twenty percent of the medium is branched off into the shunt to isolate the extract and to purify the solvent. The weight ratio $SF_6$: tobacco is maintained at 10 : 1 to 6 : 1. The nicotine content after treatment was reduced to 0.09%, dry. The aroma was not impaired.

EXAMPLE 8

In this example, the apparatus according to FIG. 6 is used to carry out the above described three-stage process. Carbon dioxide is used as the extraction agent. Vessel 16 is charged with 1 kg of Brazil tobacco having a nicotine content of 3.72%. The operating conditions in the individual stages are stated below. (The figure 16, 17 and 18 refer to the values in the respective vessels):

First stage: The cycle is continued for 6 hours at a rate of 15 kg of $CO_2$ per hour.

Temperature: $t_{16} = 60°$ C.; $t_{17} = 25°$ C.

Pressure: $P_{16} = 330$ atm (gauge); $p_{17} = 63$ atm (gauge)

Second stage: The cycle is continued for 16 hours for P.H. under isothermal conditions; vessel 18 contains 2N sulfuric acid.

Temperature: $t_{16} = t_{18} = 60°$ C.

Pressure: $P_{16} = 350$ atm (gauge); $p_{18} = 63$ atm (gauge)

Third stage: The cycle is continued for 4 hours.

Temperature: $t_{16} = 25°$ C.; $t_{17} = 60°$ C.

Pressure: $P_{16} = 63$ atm (gauge); $P_{17} = 330$ atm (gauge).

After evacuation of the apparatus, a tobacco is obtained which now contains only 0.07% nicotine, dry and therefore, according to the usual rating, is considered as nicotine free. It does not differ from the starting material either in aroma, color, or structure.

Corresponding results are obtained when $N_2O$, $SF_6$, $ClCF_3$ or Ar are used as extraction agents.

What is claimed is:

1. A process for the selective aroma preserving extraction of nicotine from tobacco with normally gaseous solvents characterized in that the tobacco is extracted with the said solvent in the presence of at least 10% by weight of moisture based on the weight of the tobacco either in the liquid state at a pressure of from about 65 to 300 atmospheres or in the supercritical state at a temperature from the critical temperature of the solvent to about 100° C. at a pressure of from about 70 to 1500 atmospheres.

2. A process as in claim 1 wherein the moisture content of the tobacco is up to about 25% by weight.

3. A process as in claim 1 wherein the extraction solvent is $CO_2$.

4. A process as in claim 1 wherein the extraction solvent is Ar.

5. A process as in claim 1 wherein the extraction solvent is $SF_6$.

6. A process as in claim 1 wherein the extraction solvent is a lower halogenated carbon.

7. Process as claimed in claim 1, wherein the extraction solvent is $N_2O$.

8. A process for reducing the nicotine content of tobacco comprising the steps of:

(a) traversing an extraction vessel containing dry tobacco with a stream of dry, normally gaseous, nicotine extraction solvent in the super-critical state at a temperature from the critical temperature to about 100° C. at a pressure of from about 70 to 1500 atmospheres to extract the aroma constituents of the tobacco together with a neglibible amount of nicotine;

(b) separating the aroma constituents from the nicotine extraction agent;

(c) wetting the dry tobacco to a water content of from about 10% to 25% by traversing it with a water wet, nomrally gaseous, nicotine extraction solvent in the supercritical state at a temperature from the critical temperature to about 100° C. at a pressure of from about 70 to 1500 atmospheres to extract substantially all of the remaining nicotine content from the wet tobacco;

(d) taking up the precipitated aroma constituents with a dry, normally gaseous solvent in the supercritical state at a temperature of from the critical temperature to about 100° at a pressure of from about 70 to 1500 atmospheres to form an extract; and (e) redepositing the aroma constituents from the extract produced in step (e), in and on tobacco from which aroma constituents and nicotine have been removed.

9. A process as in claim 8 carried out in a continuous manner.

10. A process for reducing the nicotine content of tobacco comprising the steps of:

(a) traversing an extraction vessel containing dry tobacco with a stream of dry, normally gaseous nicotine extraction solvent in the supercritical state at a temperature from the critical temperature to about 100° C. at a pressure of from about 70 to 1500 atmospheres to extract the aroma constituents of the tobacco together with a negligible amount of nicotine;

(b) allowing the solvent to expand into a second vessel with cooling to convert it to a subcritical liquid and to precipitate the aroma constituents and nicotine;

(c) converting the subcritical liquid from Step B to a supercritical gas by heating it to a temperature of from the critical temperature to about 100° C. and increasing the pressure to from about 70 to 1500 atmospheres;

(d) wetting the heated, compressed, supercritical gas by passage through water and traversing it through the extraction vessel to increase the water content of the tobacco up to about 20% to 25% and extract the nicotine content of the tobacco;

(e) taking up the precipitated aroma constituents with a dry, normally gaseous solvent in the supercritical state at a temperature of from the critical temperature to about 100° C. at a pressure of from about 70 to 1500 atmospheres to form an extract; and (f) redepositing the aroma constituents from the extract in and on the previously dried tobacco by expanding and cooling the extract in the extraction vessel containing the tobacco.

11. A process as in claim 10 carried out in a continuous manner.

12. A continuous process for reducing the nicotine content of tobacco comprising the steps of:

(a) traversing an extraction vessel containing dry tobacco with a stream of dry, normally gaseous, nicotine extraction solvent in the supercritical state at a temperature from the critical temperature to about 100° C. at a pressure of from 70 to 1500 atmospheres to extract the aroma constituents of the tobacco together with a negligible amount of nicotine;

(b) allowing the solvent to expand into a second vessel with cooling to convert it to a subcritical liquid and to precipitate the aroma constituents and nicotine;

(c) converting the subcritical liquid from Step B to a supercritical gas by heating it to a temperature of from the critical temperature to about 100° C. and increasing the pressure to from about 70 to 1500 atmospheres and returning the heated, compressed supercritical gas to the extraction vessel;

(d) repeating steps (a), (b) and (c) to remove the desired quantities of aroma producing constituents from the tobacco, and thereafter passing the supercritical gas through an aqueous sulfuric solution to wet it and to absorb the nicotine;

(e) traversing the wet, supercritical gas through the tobacco in the extraction vessel to increase its moisture content up to about 20% to 25% and extract the nicotine content of the tobacco;

(f) thereafter drying the tobacco and the wet, supercritical gas by decreasing the temperature of the gas while continuing the cycle it through the extraction vessel and the sulfuric acid solution to deposit the water from the gas into the solution;

(g) taking up the aroma producing constituents precipitated in step (b) by contact with the dry, supercritical gas from step (f) to form an aroma constituents containing extract; and (h) redepositing the aroma constituents from the extract in and on the tobacco by expanding and cooling the extract in the extraction vessel containing the tobacco.

13. A process as in claim 12 wherein the supercritical gas from Step D passes through water before traversing the extraction vessel in Step E.

14. A continuous process for reducing the nicotine content of tobacco comprising the steps of:

(a) traversing an extraction vessel containing dry tobacco with a stream of dry, normally gaseous, nicotine extraction solvent in the supercritical state at a temperature from the critical temperature to about 100° C. at a pressure of from about 70 to 1500 atmospheres to extract the aroma constituents of the tobacco together with a negligible amount of nicotine;

(b) allowing the solvent to expand into a second vessel with cooling to convert it to a subcritical liquid and to precipitate the aroma constituents and nicotine;

(c) converting the subcritical liquid from step (b) to a supercritical gas by heating it to a temperature of from the critical temperature to about 100° C. and increasing the pressure to from about 70 to 1500 atmospheres and returning the heated, compressed, supercritical gas to the extraction vessel;

(d) repeating steps (a), (b) and (c) to remove the desired quantities of aroma producing constituents from the tobacco and thereafter traversing the supercritical gas through water to wet it;

(e) traversing the wet, supercritical gas through the tobacco in the extraction vessel to increase its moisture content up to about 20% to 25% and extract the nicotine content of the tobacco;

(f) traversing the wet, supercritical gas containing the nicotine through an absorbent column containing an absorbent for the nicotine;

(g) thereafter drying the tobacco and the wet supercritical gas by decreasing the temperature of the gas to condense the water content thereof;

(h) taking up the aroma producing constituents precipitated in step (b) by contact with the dry, supercritical gas from step (f) to form an aroma constituents containing extract; and (i) redepositing the aroma constituents from the extract in and on the tobacco by expanding and cooling the extract in the extraction vessel containing the tobacco.

15. A process as in claim 14 wherein the absorbent is aluminum oxide, silica gel, active carbon, an ion exchange resin, impregnated kieselguhr or a molecular filter.

16. A continuous process for reducing the nicotine content of tobacco comprising the steps of:

(a) traversing an extraction vessel containing dry tobacco with a stream of dry, normally gaseous, nicotine extraction solvent in the supercritical state at a temperature from the critical temperature to about 100° C. at a pressure of from about 70 to 1500 atmospheres to extract the aroma constituents of the tobacco together with a negligible amount of nicotine;

(b) allowing the solvent to expand into a second vessel with cooling to covert it to a subcritical liquid and to precipitate the aroma constituents and nicotine;

(c) converting the subcritical liquid from step (b) to a supercritical gas by heating it to a temperature of from the critical temperature to about 100° C. and increasing the pressure to from about 70 to 1500 atmospheres and returning the heated, compressed supercritical gas to the extraction vessel;

(d) repeating steps (a), (b), and (c) to remove the desired quantities of aroma producing constituents from the tobacco, and thereafter passing the supercritical gas through an aqueous sulfuric acid solution to wet it and to absorb the nicotine;

(e) traversing the wet, supercritical gas through the tobacco in the extraction vessel to increase its moisture content up to about 20% to 25% and extract the nicotine content of the tobacco;

(f) drying the tobacco;

(g) thereafter drying the wet, supercritical gas by decreasing the temperature of the gas while continuing to cycle it through the extraction vessel and the sulfuric acid solution to deposit the water from the gas into the solution;

(h) taking up the aroma producing constituents precipitated in step (b) by contact with the dry, supercritical gas from step (f) to form an aroma constituents containing extract; and (i) redepositing the aroma constituents from the extract in and on the tobacco by expanding and cooling the extract in the extraction vessel containing the tobacco.

17. A continuous process for reducing the nicotine content of tobacco comprising the steps of:

(a) traversing an extraction vessel containing dry tobacco with a stream of dry, normally gaseous nicotine extraction solvent in the supercritical state at a temperature from the critical temperature to about 100° C. at a pressure of from about 70 to 1500 atmospheres to extract the aroma constituents of the tobacco together with a negligible amount of nicotine;

(b) allowing the solvent to expand into a second vessel with cooling to convert it to a subcritical liquid and to precipitate the aroma constituents and nicotine;

(c) converting the subcritical liquid from step (b) to a supercritical gas by heating it to a temperature of from the critical temperature to about 100° C. and increasing the pressure to from about 70 to 1500 atmospheres and returning the heated, compressed supercritical gas to the extraction vessel;

(d) repeating steps (a), (b), and (c) to remove the desired quantities of aroma producing constituents from the tobacco and thereafter traversing the supercritical gas through water to wet it;

(e) traversing the wet, supercritical gas through the tobacco in the extraction vessel to increase its moisture content up to about 20% to 25% and extract the nicotine content of the tobacco;

(f) traversing the wet, supercritical gas containing the nicotine through an absorbent column containing an absorbent for the nicotine;

(g) drying the tobacco;

(h) thereafter drying the wet supercritical gas by decreasing the temperature of the gas to condense the water content thereof;

(i) taking up the aroma producing constituents precipitated in step (b) by contact with the dry supercritical gas from step (f) to form an aroma constituents containing extract; and (j) redepositing the aroma constituents from the extract in and on the tobacco by expanding and cooling the extract in the extraction vessel containing the tobacco.

18. A process for the selective aroma preserving extraction of nicotine from tobacco with normally gaseous nicotine solvent characterized in that the tobacco is extracted with the said solvent either in the presence of at least 10% by weight of moisture based on the weight of the tobacco in the liquid state at a pressure of from about 65 to 300 atmospheres or in the supercritical state.

19. Process according to claim 18, the solvent being above the critical temperature and above the critical pressure.

20. Process according to claim 19, the tobacco having a moisture content of 10–25% by weight.

21. Process according to claim 19, the tobacco being wet.

22. Process of claim 18, wherein the solvent is in said liquid state.

23. Process of claim 22, wherein the solvent is $CO_2$.

24. Process of claim 22, wherein the solvent is $SF_6$.

25. Process of claim 22, wherein the solvent is lower halogenated hydrocarbon.

26. Process of claim 22, wherein the extraction solvent is $N_2O$.

27. Process of claim 18, wherein the solvent is in supercritical state.

28. Process of claim 27, wherein the solvent is $CO_2$.

29. Process of claim 27, wherein the solvent is Ar.

30. Process of claim 27, wherein the solvent is $SF_6$.

31. Process of claim 27, wherein the solvent is lower halogenated solvent.

32. Process of claim 27, wherein the extraction solvent is $N_2O$.

* * * * *

UNITED STATES PATENT AND TRADEMARK OFFICE
CERTIFICATE OF CORRECTION

PATENT NO. : 4,153,063
DATED : May 8, 1979
INVENTOR(S) : Wilhelm Roselius et al.

It is certified that error appears in the above-identified patent and that said Letters Patent are hereby corrected as shown below:

Column 1, line 36, for "severly" read --severely--;
Column 1, line 43, for "$CHF_3CClF_3$" read --$CHF_3$, $CClF_3$--;
Column 1, line 44, for "$CCl_2F_2\ CHCl_2F$" read --$CCl_2F_2$, $CHCl_2F$--
Column 2, line 7, for "supercritical" read --subcritical--;
Column 3, line 51, for "tobbcco" read --tobacco--;
Column 4, line 43, for "suitale" read --suitable--;
Column 5, line 1, for "molcular" read --molecular--;
Column 8, line 42, for "nomrally" read --normally--.

Signed and Sealed this

Sixteenth Day of October 1979

[SEAL]

Attest:

RUTH C. MASON
Attesting Officer

LUTRELLE F. PARKER
Acting Commissioner of Patents and Trademarks